United States Patent [19]
Hardy et al.

[11] Patent Number: 5,918,641
[45] Date of Patent: Jul. 6, 1999

[54] FLEXIBLE TUBULAR CONDUIT COMPRISING A JACKET MADE OF CROSSLINKED POLYETHYLENE DEVICE AND PROCESS FOR MANUFACTURING SUCH A CONDUIT

[76] Inventors: Jean Hardy, Résidence Boieldieu, 22, rue Louis-Ganne, 76360 Barentin; Michel Morand, 159, rue des Jardins, 76480 Duclair, both of France

[21] Appl. No.: 08/861,573

[22] Filed: May 22, 1997

Related U.S. Application Data

[63] Continuation of application No. 07/809,532, filed as application No. PCT/FR91/00487, Jun. 18, 1991, which is a continuation of application No. 08/311,004, Sep. 22, 1994, abandoned, which is a continuation of application No. 08/586,306, Jan. 17, 1996, abandoned.

[30] Foreign Application Priority Data

Jun. 18, 1990 [FR] France ................................. 90 07576

[51] Int. Cl.$^6$ ...................................................... F16L 11/00
[52] U.S. Cl. ........................... 138/132; 138/137; 138/140
[58] Field of Search ..................................... 138/129, 130, 138/132, 134, 135, 172, 174, 137, 141, 140, 125, 126, DIG. 7

[56] References Cited

U.S. PATENT DOCUMENTS

| | | | |
|---|---|---|---|
| 3,908,703 | 9/1975 | Bournazel et al. ...................... | 138/137 |
| 4,013,100 | 3/1977 | Thiery et al. ........................... | 138/132 |
| 4,402,346 | 9/1983 | Cheetham et al. ...................... | 138/130 |
| 4,403,631 | 9/1983 | Abdullsev et al. ..................... | 138/132 |
| 4,549,581 | 10/1985 | Unno et al. ............................ | 138/132 |
| 4,614,208 | 9/1986 | Skapelius ............................... | 138/140 |
| 4,758,624 | 7/1988 | Sekiguchi et al. ................. | 138/DIG. 7 |
| 4,857,250 | 8/1989 | Gale et al. .......................... | 138/DIG. 7 |
| 4,867,205 | 9/1989 | Bournazel et al. ...................... | 138/130 |
| 4,927,184 | 5/1990 | Bourjot et al. .......................... | 138/141 |

FOREIGN PATENT DOCUMENTS

| | | |
|---|---|---|
| 286036 | 11/1970 | Austria . |
| 0087344 | 8/1983 | European Pat. Off. . |
| 0147288 | 7/1985 | European Pat. Off. . |
| 2225681 | 11/1974 | France . |
| 2596696 | 10/1987 | France . |
| 2611582 | 9/1988 | France . |
| 2059538 | 4/1981 | United Kingdom . |

OTHER PUBLICATIONS

OTC 6725, "Realistic Evaluation Techniques for Flexible Pipe Polymers Exposed to Wellbore Fluids", GK Wolfe, et al., May 6–9, 1991, Offshore Technology Conf. pp. 263–272.

OTC 6727, "Design of Flexible Pipe for High–Temperature Fluid", Y. Makino et al., May 6–9, 1991, Offshore Technology Conference, pp. 281–288.

"Design and Materials Considerations for High Pressure Flexible Flowlines", The Society for Underwater Technology, Colquhoun et al., May 1990, pp. 1–20.

OTC 6873, "Specifying, Monitoring, and Verifying Quality and Reliability of Flexible Pipe", Michel Bouvard et al., May 4–7, 1992, Offshore Technology Conference, pp. 9–16.

*Primary Examiner*—Patrick F. Brinson
*Attorney, Agent, or Firm*—Hoffman, Wasson & Gitler

[57] ABSTRACT

The present invention relates to a flexible tubular conduit with a jacket or tube made of crosslinked polyolefin, especially crosslinked polyethylene. The jacket or tube is made from polyolefin crosslinked by hydrolysis.

5 Claims, 7 Drawing Sheets

FLEXIBLE TUBULAR CONDUIT COMPRISING A JACKET MADE OF CROSSLINKED POLYETHYLENE DEVICE AND PROCESS FOR MANUFACTURING SUCH A CONDUIT

This application is a continuation of application Ser. No. 07/809,532, filed as PCT/FR91/00487, filed Jun. 18, 1991, which is a continuation of 08/311,004 Filed Sep. 22, 1994, Ser. No. 08/586,306 filed on Jan. 17, 1996, all abandoned.

The present invention relates to flexible tubular conduits comprising at least one tube and/or one jacket made of crosslinked polyolefin, especially made of crosslinked polyethylene, a device adapted to the crosslinking of the jacket and a process for manufacturing the flexible tubular conduit.

It is known to produce flexible tubular conduits comprising at least one tube or impervious jacket made of plastic and plies of armouring providing the compressive and tensile strength. In particular, the filing company has developed and marketed high-performance flexible tubular conduits intended for oil production from off-shore deposits, a description of which has been given at the conference "Improved Thermoplastic Materials for Offshore Flexible Pipes" by F. A. DAWANS, J. JARRIN, to LEFEVRE and M. PELISSON during the 18th session of the OTC at HOUSTON (OTC 5231).

There are also known, by the name umbilicals, piping systems constituted by the assembling of a plurality of flexible pipes of the hydraulic-flexible pipe type, which systems are used in the same offshore oil production installations as means for linking with distant equipment in order to provide hydraulic or electro-hydraulic remote-controlled functions, or other diverse functions.

Various plastics are used for the tubes or impervious jackets.

Polyolefins, principally polyethylene, and in particular high density polyethylene (HDPE in Anglo-Saxon terminology) undergo physicochemical attack from crude oil containing gas (live crude in Anglo-Saxon terminology).

Polyamides 11 and 12 are highly resistant to crude oil and are generally satisfactory, but they are expensive. In addition, these polyamides can undergo a hydrolysis in the presence of water. Now, crude oils often contain water. This hydrolysis does not generally have unacceptable consequences on the operation of static flexible tubular conduits. On the other hand, for flexible tubular conduits comprising a jacket made of polyamide 11 or 12 undergoing varying deformations, as for example in the case of flexible tubular conduits suspended in catenaries between two movable supports (jumper in Anglo-Saxon terminology) or flexible tubular conduits intended for raising crude oil from the bottom up to the surface (riser in Anglo-Saxon terminology), there may be a degradation of the plastic resulting from losses of imperviousness if the crude oil contains water and is at a relatively high temperature. These losses of imperviousness originate from the propagation of cracks in the partially hydrolysed polyamide. In such a case, even an increase in thickness, which would not end up in an increase in the cost price of the flexible tubular conduit, does not succeed in guaranteeing the imperviousness over a long period of use as, for example a period of between 5 and 20 years. The relationship between the rate of degradation and the temperature reached by the plastic is expressed by a formula of the Arrhenius-law type. Furthermore, polyamides have a relatively high permeability with respect to methanol, which is currently used in offshore oil production installations, and to other fluids of the alcohol family; thus it has been found that this phenomenon is the cause of significant leaks which have been observed from long-length umbilicals. These observations lead to the necessity of finding another material as a replacement for polyamides 11 or 12 which had been adopted for these applications since they were the best materials capable of resisting the particular use conditions, in particular the compatibility with crude oil.

Thus, for flexible tubular conduits intended for conveying high-temperature hydrocarbons containing water, or a fluid of the alcohol family, and, in particular, subjected to dynamic effects, plastics comprising polyvinylidene fluorides (PVDF in Anglo-Saxon terminology) in the form of a homopolymer or copolymer are used. However, fluorine-containing plastics are extremely expensive and can be more than 20 times the cost of the corresponding volume of polyethylene.

On the other hand, it is known to improve certain properties of polyethylene by crosslinking. Three crosslinking methods can be employed, by irradiation, by silane, or by a chemical route, especially by peroxide. In particular, the silane method with crosslinking by hydrolysis of methoxy groups, $R—Si—[OCH_3]_3$, has especially been expounded by Applied Organometallic Chemistry of 1988 (in the article "Silane compound in hot-water pipe and cable technology" p. 17 to 31).

It is known from the European Patent Application 83400256 published under the No. 0,087,344 to improve the mechanical behaviour of polyethylenes, for large diameter tubes, by chemical crosslinking using peroxides. The chemical crosslinking method requires large quantities of heat. It has never been able to be implemented on an industrial scale for producing tubes made of polyethylene for high-performance flexible structures insofar as the increase in temperatures required for obtaining the crosslinking does not enable the tubes to support their own weight.

The present invention makes it possible to remedy the drawbacks of flexible tubular conduits of known types. According to the invention, a tube or a jacket of a flexible tubular conduit made from a polyolefin, advantageously a polyethylene, containing silane, is crosslinked by hydrolysis.

As a result of research work carried out by the Applicant company, it has been found, surprisingly, that a tube or an impervious jacket made of polyolefin, advantageously of polyethylene, crosslinked by silane, maintains satisfactory mechanical properties when it is exposed for significant periods to crude oil containing gas (live crude) at a relatively high temperature, in excess of 60° C. and which can reach at least 90° C. and, possibly, 100° C. The compatibility with crude oil containing gas thus discovered is obtained when the level of silane crosslinking is at least equal to approximately 60%, the duration of possible service varying depending on the particular aspects of each application case, but always being greater than 1 year, and normally being several years, and which can reach, for example, 20 years. It has been shown in Patent EP 087,344 mentioned hereinabove that such a property of resistance to a hydrocarbon medium may be obtained with a high or medium density polyethylene chemically crosslinked by peroxide comprising a particular plastifying agent. However, until now it was acknowledged that a silane-crosslinked polyethylene cannot be used in a hydrocarbon medium; in particular, the use of tubes made of silane-crosslinked polyethylene were known to date only for producing hotwater central heating installations with crosslinking levels greater than 65% but whose actual value measurable in the manufactured tube does not exceed, in practice, 72%, although theoretical values, which can reach up to 80%, are occasionally mentioned.

It has thus been established that the behaviour, in the presence of crude oil, of a tube or of a jacket made of crosslinked polyolefin is conditioned by its level of crosslinking. It has furthermore been found that the value of the level of crosslinking actually reached at the end of the manufacturing process, when the crosslinking operation is completed, plays a key role in the said behaviour, and this is independent of the ultimate increase in the level of crosslinking which may occur spontaneously. In fact, since the value of the level of crosslinking reached at the end of the crosslinking operation is, inevitably, somewhat lower than the possible maximum value which corresponds to the notion of potential level of crosslinking (or gel content), this notion being defined hereinbelow, it is possible for the level of crosslinking to continue to increase after the end of the crosslinking operation, during storage or in service, depending on the natural conditions of the environment or the conditions of use. In particular, it is preferable for the difference between the actual level of crosslinking reached at the end of the crosslinking operation and the potential level of crosslinking to be relatively small. In fact, it has been found, on the one hand, that, if this difference is large, the subsequent change in the level of crosslinking depending on the circumstances becomes unpredictable and, on the other hand, that polyolefins, in particular polyethylenes, used for producing the tube or the impervious jacket must be in a more or less stabilised state in order for it to be possible to guarantee the good hydrocarbon resistance thereof.

For example, it has been found that a crosslinking in which the difference between the potential level of crosslinking and the actual level of crosslinking reached at the end of the crosslinking process was equal to 5% (potential level of crosslinking 80%, level of crosslinking actually reached 75%) provides an excellent hydrocarbon resistance of the crosslinked jacket. Likewise, differences of 8% and approximately 10% have enabled a good hydrocarbon resistance to be observed. It is thought that differences of the order of 10% enable the desired good hydrocarbon resistance to be guaranteed, while a difference of 15% runs the risk of leading to a degradation over time of the hydrocarbon resistance of the jacket or of the tube.

According to the invention, significant results have been obtained by selecting the grades of base polyethylene and the free-radical promoter and crosslinking agent (silane) contents, and/or by adjusting the conditions of the crosslinking operation so as to obtain a level of crosslinking greater than 70% at the end of the crosslinking operation.

Preferably, the tube or the impervious jacket is constituted from a silane-crosslinked polyethylene having a level of crosslinking equal to or greater than 75%.

The behaviour in the presence of crude oil is particularly good when the materials utilised by extrusion for producing the tube or the impervious jacket to be crosslinked are homopolymers or copolymers of ethylene or mixtures of the two, of the high-density polyethylene (HDPE in Anglo-Saxon terminology) or medium-density polyethylene (MDPE in Anglo-Saxon terminology) type not comprising low-density polyethylenes (LDPE in Anglo-Saxon terminology).

It is possible to utilise various processes for converting and crosslinking the polyethylene, of which examples of silane crosslinking are described hereinbelow.

It is advantageous to exclude polyethylene whose density is less than a minimum value. This exclusion is applicable to the compound utilised, especially to the grafted mixture constituted by silane-grafted polyethylene, during a prior operation, both to the polyethylene serving as base, to the compound, called masterbatch, possibly containing the catalyst and to other polyethylene-based compounds which are not grafted and not combined with a catalyst.

It is possible to utilize various processes for converting and crosslinking the polyethylene, of which examples of silane crosslinking are described hereinbelow. The minimum value of the density of the polyethylene, below which it is essential not to fall, depends on the process utilised.

Although a theoretical explanation justifying the results obtained on this subject has not been found, it has in fact been found that the compatibility to crude oil is considerably inferior if one of the compounds used for being transformed by extrusion is based on low-density polyethylene or on low values of medium-density polyethylenes, and this is included in the case of the masterbatch even though the latter represents a very limited percentage of the total quantity of polyethylene utilised. By way of comparison, it may be noted that the mixtures used, according to previously known applications, in order to produce plastic tubes for hot water or electrical cable sleeves, practically always comprise at least one compound constituted by, or based on, low-density polyethylene or on low values of medium-density polyethylenes. Preferably, according to the invention, the grafted polyethylene constituting the grafted mixture and the polyethylene or polyethylenes used for producing the masterbatch and/or the other compounds utilised by extrusion have a density not less than 0.931 and, advantageously, not less than 0.940, the best results being obtained with a density not less than 0.950.

Moreover, the test results on prototypes have shown that, relative to the tubes or to the internal impervious jackets produced with the same materials in a non-crosslinked state, the flexible tubular conduit pipes or internal impervious jackets which are made from polyolefin, in particular polyethylene, and crosslinked by hydrolysis have a considerably higher resistance to the effects of cracking under stress (stress cracking in Anglo-Saxon terminology) not only in the presence of a hydrocarbon (these effects then being able to additionally increase the blistering effects described later) but also in the presence of fluids of the alcohol family, such as methanol, this property being very important in the case, in particular, of hydraulic flexible pipes used in oil production installations.

The utilisation and the crosslinking of polyolefin, preferably of polyethylene, containing silane, may be carried out, for example, by the "SIOPLAS" process, by the "MONOSIL" process or by any other process employing a hydrolysis reaction for example. By hydrolysis reaction is meant here, in a manner known per se, a hydrolysis reaction of groups of the type

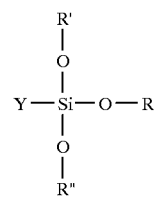

with condensation of two siloxane functions carried by two different olefinic chains in the presence of a catalyst and under the effect of heat and enabling the formation of the

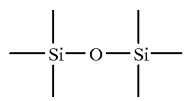

bond, characteristic of the crosslinking, the siloxane functions being previously obtained by substitution of an OH radical by at least one of the three radicals O—R, O—R', O—R" of the grafted part of the polyolefin, each of the three radials O—R, O—R', O—R" being, currently, a methoxy radical or an ethoxy radical, or even another alkane radical containing an oxygen bonded to silicon, and the grafting of the polyolefin having been carried out during a prior operation by fixing a silane onto a polyolefin which has free radicals following the action of a free-radical promoter, normally a peroxide.

In a particularly advantageous method of utilisation of the process according to the present invention, the interior of the flexible conduit is filled with water in a liquid and/or gaseous form, or an aqueous solution, in order to permit the hydrolysis.

In a particular utilisation method, a portion at least of the catalyst which promotes the hydrolysis reaction is suspended or dissolved in the water or the fluid containing water which is inside the flexible conduit to be crosslinked. It is thus possible either to combine the action of the catalyst contained in the fluid inside the conduit with the action of the catalyst introduced into the extruder with the polyolefinic resins (by the SIOPLAS or MONOSIL process, for example), or to utilise the totality of the catalyst used by dissolution or dispersion in the fluid inside the conduit. It has been found that the efficiency of the crosslinking operation may be increased and, in particular, relatively high levels of crosslinking obtained without having to increase the duration of the operation when the totality of the catalyst of the catalyst used is supplied by the fluid inside the conduit.

The heat necessary for the crosslinking process to build up in a suitable manner may be emitted and transferred to the tube or to the impervious jacket to be crosslinked by any known means.

A particularly advantageous process according to the present invention enables the tube or the flexible tubular conduit themselves to be used in order to convey a fluid for supplying the heat making it possible to increase and to maintain the temperature necessary for obtaining the desired reaction in a reasonable time. It is also possible to use as heating resistance elements electrically conductive wires disposed inside the wall of the flexible tubular conduit; in particular, it is possible to use for this purpose all or a portion of the plies of metallic wires which constitute the strength armouring of the flexible pipe. An example of a heating flexible pipe of this type is described in Patent Application FR 90.06186. Alternatively, with a heat-conductive fluid within the flexible conduit, it is also possible to use a heating electrical resistance element, such as a sealed cable, disposed within the flexible conduit over at least a portion of its length.

In an advantageous embodiment, the water or a fluid containing water is circulated within the flexible conduit in order to permit the hydrolysis and is heated to a sufficient temperature in order to cause the desired reaction in a reasonable time.

In fact, it has been discovered, as a result of work devoted by the filing company to the design of the various crosslinking processes which can be envisaged, that, in the case of continuous flexible conduits of long length, such as those used in offshore oil production installations, and in particular when these flexible conduits comprise a relatively thick wall composed of several layers of plastic or elastomeric jackets and plies of armouring imparting to it a high strength, it is particularly advantageous to use the internal conduit of the flexible pipe in order to circulate under pressure the fluid which supplies the tube or the impervious jacket with water and/or the heat enabling the crosslinking to be carried out under the correct conditions.

The high strength flexible conduits with a structure having several layers, which are particularly advantageous, have diameters varying from 25 mm to 500 mm, and allowable internal pressures which may vary depending on the diameter having a minimum value of 20 bar and which may reach 1000 bar.

Generally it is particularly important that the method used for carrying out the crosslinking operation enables the desired level of crosslinking to be obtained in a relatively short operating duration, this duration possibly being, in practice, a few days and possibly reaching the order of about ten days. Independently of the importance of being able to reduce the duration of the manufacture, the crosslinking method according to the invention, with internal circulation of water or of fluid containing water at an elevated temperature, is particularly advantageous because of its greater efficiency, due to the fact that the property of resistance to crude oil of the silane-crosslinked polyethylene has been found as dependent, inter alia, on obtaining a level of crosslinking which is sufficiently high after the end of the crosslinking operation and which differs relatively little in relation to the potential level of crosslinking. Furthermore, it has been found that, if the progressive increase in the level of crosslinking occurs too slowly during the crosslinking operation, this results in it becoming very difficult, indeed even impossible, to reach a sufficiently high final level of crosslinking; it appears possible to explain this difficulty by the fact that too slow a crosslinking process enables the formation of bonds of various types between the olefinic chains, these bonds possibly, on the one hand, being incapable of promoting the resistance to crude oil of a silane-crosslinked polyolefin and taking, on the other hand, the place of the desired bonds of type:

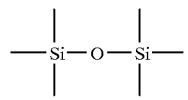

In order for the crosslinking operation to be carried out correctly and in a reasonable period of time, it is essential that, throughout the duration of the crosslinking operation, the temperature of the tube or of the impervious jacket in question is, over the entire length of the flexible pipe, maintained between two specified limits. On the one hand, the temperature must remain less than a certain upper limit which is specified depending on the material used so as to preserve the mechanical properties at the desired level and must not exceed, for polyethylene, a temperature of approximately 120° C. corresponding to the threshold for melting of the small crystallites. On the other hand, the temperature must remain greater than a certain lower limit which is fixed depending on the energy necessary for obtaining the crosslinking kinetics compatible with an acceptable operating duration, for example less than one week. The minimum temperature is at least 85° C. and, preferably, 90° C. for polyethylene.

In order to carry out the crosslinking in a reasonable period of time and to ensure the final quality of the product obtained, the studies carried out by the Applicant company have shown that it is very important to verify that the temperature limitations defined hereinabove are correctly observed in the crosslinking operation; this verification makes it possible in fact, in combination with the control of the other factors involved in the operation, and by making reference to preliminary tests for adjusting the process, to ensure that the crosslinked material possesses precisely the quality desired. Such a method of verification is particularly important in the case where, as is described hereinbelow, a tube or a jacket covered by layers of armouring and by one or more other jackets is cross-linked, which makes it difficult or impossible to inspect for correct crosslinking of the impervious jacket; it is therefore advantageously applicable to the manufacture of high-strength flexible tubular conduits intended for the exploitation of offshore oilfields which must be able to guarantee imperviousness for long periods, for example 20 years. Since the risk of pollution is unacceptable, it is imperative to be able to be absolutely certain of the absence of defects in the flexible tubular conduit produced.

In other words, it is therefore necessary for the temperature reduction which the heat transfer fluid undergoes between the inlet and the outlet of its circulation in the flexible conduit, and which is connected with the heat supply thus supplied to the tube or to the impervious jacket and with the thermal losses, to be less than a specified limit.

As a result, the rate of circulation of the heat transfer fluid in the flexible conduit must be greater than a certain value which may be specified depending on the specific characteristics of the operation in question such that the temperature at the outlet of the flexible conduit is not less than the lower limit defined hereinabove. The heat transfer fluid must therefore be pumped under a pressure making it possible to overcome the pressure drop resulting from the required rate of circulation, which may be relatively substantial depending on the envisaged values of the internal passage cross-section and the length of the flexible conduit.

For relatively short lengths of conduits and, in particular, if the diameter is sufficiently great, it is possible to carry out the crosslinking operation on a flexible conduit composed solely of an impervious tube made of polyolefin, preferably made of polyethylene, which thus has to be crosslinked. In the case where the crosslinked tube constitutes the impervious internal layer of a flexible pipe of the type having a smooth internal conduit ("Smooth Bore" in Anglo-Saxon terminology) having a composite structure, it is then possible to install around the internal tube other layers, reinforcement armouring layer and outer jacket, and other possible intermediate jackets.

In certain cases, the flexible tubular conduit is provided on the inside of the impervious jacket, with a layer, for example a metallic layer, which, although non-impervious, is sandwiched between the impervious jacket to be crosslinked and the fluid used for causing the crosslinking, for example hot water. Such a metallic layer is, for example, constituted by a fastened tape in the usual case of flexible pipes having a rough inner conduit, called "Rough Bore" in Anglo-Saxon terminology, which are manufactured by the Applicant company. Such a non-impervious inner layer seems, a priori, to constitute an obstacle preventing water from reaching the impervious jacket to be crosslinked; thus it is normally expected to observe that the crosslinking operation with the supply of water via the inside of the tube becomes, under these conditions, very much less effective, indeed even impossible to carry out in a reasonable period of time. However, it has been found, surprisingly, that an impervious jacket made of polyolefin, preferably made of polyethylene, disposed around a non-impervious internal layer may be crosslinked effectively and in acceptable periods of time according to the process of the invention, by circulating hot water inside the flexible tubular conduit. In fact, tests on prototypes have shown, without this phenomenon having been explained to date, that the water necessary for the build-up of the crosslinking process may be propagated uniformly and without excessive delay into all the portions of the impervious plastic jacket despite the presence of the non-impervious internal layer, in particular in the case where the latter is constituted, in the form of a flexible metallic pipe, by the helical winding of a doubly-fastened profiled metallic band, such as a fastened sheet fulfilling the function of internal casing for the flexible tubular conduit. In such a case, with the object of reducing the duration of the crosslinking operation, it may be advantageous according to the invention to provide means guaranteeing not only the temperature during the reaction time, but also a minimum pressure. The critical zone is the downstream end of the flexible conduit where the lowest temperature and the least internal pressure are found simultaneously, it has in fact been found that the level of crosslinking may reach the desired value more rapidly when the internal pressure exerted on the down-stream end of the flexible conduit by the circulation of the fluid used is equal to or greater than the minimum pressure defined hereinabove. The value of the minimum pressure is dependent on the characteristics of the non-impervious internal layer and on the structure of the flexible conduit, and may be determined by virtue of prior adjusting tests. It may reach, for example, depending on the circumstances, a few bar to a few tens of bar, the minimum value being approximately 3 bar and the recommended values in practice currently being of the order of 20 bar. The circulation of the fluid used inside the flexible conduit must be provided under a pressure at least equal to the sum of the said downstream minimum pressure and the pressure drop down the length of the flexible conduit and connection piping.

Alternatively, in order to carry out the crosslinking of a simple tube or of a jacket not covered by armouring layers and/or at least one other plastic jacket, it is also possible, according to a process known per se, to dispose the tube or the jacketed conduit in an enclosure, either in turns laid flat or by winding it over a reel. Water vapour heated to a temperature of, for example, 90 to 100° C., at atmospheric pressure or under a slight pressure, may then be made to circulate in the enclosure. In the case of continuous flexible conduits of long length, and in particular flexible conduits of large diameter (greater than 25 mm and which may reach 500 mm, currently 40 to 300 mm) and whose tubes or impervious jackets have a large thickness (3 mm to 12 mm or more) of the type of flexible pipes having high mechanical strength such as those manufactured by the filing company, it has been shown that the application of this method of crosslinking by the outside raises difficulties and becomes, under certain circumstances, practically impossible to carry out. In fact, because of their weight and their length, these flexible pipes are normally disposed wound with touching turns and in successive numerous plies on reels, so as to facilitate their handling and to limit the overall size of the volume occupied by the flexible conduit. The total thickness of the layers of flexible pipes thus wound around each other becomes excessive, and it is then practically impossible, within a reasonable period of time, to raise to the desired temperature the portions of the conduit which, being in the centre of the winding, are thermally insulated by the peripheral layers from the flow of heated water vapour. Furthermore, beyond certain length and diameter limits, the plastic tube made of polyethylene heated to the crosslinking temperature would run the risk of becoming unacceptably distorted.

One solution consists in unloosening the turns and in separating the plies from each other; but, apart from this resulting in a prejudicial increase in the volume, already considerable, occupied by the conduit, such a procedure would excessively complicate the manufacturing operations.

In a particularly advantageous variant, water or fluid containing water, heated to a sufficient temperature, is circulated inside the flexible conduit, the tube or the impervious internal jacket being covered by at least one reinforcement armouring layer. This has a very significant advantage. In particular in the case of long-length conduits, the flexible conduit subjected to the conditions imposed by the crosslinking operation is capable of withstanding the forces which are applied to it and which may be relatively substantial, internal pressure (specified by the pressure drop and, possibly the minimum pressure necessary for "Rough Bore" flexible pipes), traction force (induced, in particular, by the cap effect due to the internal pressure) and crushing force for the central turns of the winding. The novel crosslinking method which consists in causing the fluid used to be circulated via the inside of the flexible pipe is thus facilitated and becomes usable in all circumstances regardless of the length of the flexible pipe to be treated, by virtue of the mechanical strength which the particular structure of the layers constituting the wall of the flexible pipe has, whereas, precisely, the specific characteristics of this wall render at least very difficult the use of a process which would consist in installing the wound flexible conduit inside an enclosure filled with heated water vapour.

Preferably, the flexible conduit is completely terminated, including the possible outer jacket, and with its connection components at each end (the fittings) finally mounted when it is connected to the crosslinking equipment, ensuring the circulation and the heating of the fluid used, the flexible conduit being preferably mounted wound with touching turns on a reel.

According to a particularly advantageous method of utilisation of the process according to the present invention, the flexible tubular conduit comprises, on the outside of the tube or of the internal impervious jacket to be crosslinked, a strength armouring comprising at least one ply of wires which are separate and wound helically with a certain lateral clearance between adjacent wires, the wires being able in particular to be metallic and being of any cross-section, for example of rectangular shape having rounded corners. Around the assembly of the plies of strength armouring, the flexible conduit is completed by an outer plastic protective jacket, normally impervious. One or more intermediate jackets may furthermore be disposed between the tube or the internal impervious jacket and the outer jacket. There are thus found, on the outside of the tube or of the internal jacket made of polyolefin to be crosslinked, one or more plies of armouring wires disposed within the annular space delimited, on the one hand, by the tube or the internal jacket and, on the other hand, depending on the situation, by the outer jacket or an intermediate jacket. In a flexible conduit of this type, known per se, the volume occupied, within the said annular space, by the assembly of the armouring wires leaves a free annular space which may have a value of, for example, between 3% and 15% of the total annular space. In this case, the flexible conduit being, when it is connected to the crosslinking device, preferably completely terminated or, at least, partially manufactured so as to comprise at least one external plastic jacket and one or more plies of armouring between the said external jacket and the tube or the internal jacket, the improvement of the process according to the invention consists in bringing into communication with the outside the free annular space which is composed of a series of continuous free channels of helical general configuration, each channel corresponding to the open space between two adjacent armouring wires. It has been found that fluid, in the liquid and/or gaseous phase, which is released via the outside of the tube or of the jacket subjected to crosslinking, is thus extracted to the outside of the conduit, depending on the build-up of the crosslinking process. Although the quantities of fluid thus extracted are relatively small, this procedure enables the efficiency of the crosslinking operation to be substantially improved. Normally, the fluids thus extracted are exhausted at atmospheric pressure. Alternatively, it is possible to further increase the efficiency of the procedure by carrying out forced extraction of the fluids. It is possible, for example, to inject a liquid and/or gaseous fluid, for example water or air, into one of the ends of the annular space in order to extract the fluids. Advantageously, the extraction of the fluids is accelerated by suction, for example by using a vacuum pump creating thereby a more or less high vacuum in the annular space. The extraction of the fluids from the free annular space may be performed in various ways. It is possible, for example, to use a passage pierced radially through the thickness of an annular metallic part disposed around the wall of the flexible conduit and forming part of the fitting mounted at one end of the conduit; an example of piercing of this type is described in Patent FR 2,630,809. It is also possible to machine one or more temporary openings through the external jacket of the flexible conduit, the said openings being blocked off when the crosslinking operation is completed.

It is well understood that the use of a pan (or a vessel) in which the flexible tubular conduit to be crosslinked is coiled, does not depart from the scope of the present invention.

Preferably, thermal insulation means are disposed around the volume occupied by the flexible conduit, for example insulating panels or an insulating flexible layer mounted on the outside of the reel (or other storage component).

When the crosslinking of the tube or of the impervious internal jacket is carried out once the manufacture of the flexible conduit is completed, the fittings being mounted on the two ends, it is beneficial to perform a hydrostatic test before starting the crosslinking operation, it being possible for the test pressure to be equal to the maximum service pressure (design pressure in Anglo-Saxon terminology) or to 1.5 times this pressure. A flexible tubular conduit which, following a fault, is not capable of holding the test pressure is rejected and the process of manufacture by crosslinking of the jacket will not be continued. Advantageously, the same device for installing and connecting the flexible conduit is used for carrying out the hydrostatic test and the crosslinking.

After completion of the crosslinking, the next step is advantageously the final hydrostatic test, the test pressure being currently equal to 1.5 times the maximum service pressure. This procedure offers the advantage of having to fill and to drain the flexible pipe only once. It is even possible, in order to save time, to carry out the hydrostatic pressure test during the crosslinking operation by bringing the pumping pressure of the fluid used to the specified value for the test, but is essential to dimension the crosslinking equipment in order to withstand the test pressure.

Insofar as the impervious jacket prevents the leakage of water towards the outside of the flexible tubular conduit, the water contained in the flexible tubular conduit will not be able to hydrolyse other layers of polyolefin, especially of polyethylene, of the flexible tubular conduit. However, the crosslinking of other jackets made of polyolefin, especially made of polyethylene, such as for example an external protective sleeve, does not depart from the scope of the present invention. In order to carry out the crosslinking by hydrolysis of external plastic jackets, it is necessary to supply the water required for the reaction. This may be carried out, as described hereinabove, by subjecting the jacket to be crosslinked to the action of heated water vapour, the flexible conduit being housed in a sealed enclosure where water vapour is made to circulate. Alternatively, the heat may equally well arise from the hot fluid circulating in the flexible tubular conduit during the process for crosslinking the impervious jacket, completely or in combination with the heat supplied by the water vapour.

In the case of the crosslinking of an outer or intermediate jacket, and equally in the case of the tube or of the impervious internal jacket, the water required for the hydrolysis reaction may already be, completely or partially, contained within the plastic material to be crosslinked, it being possible for the water to be produced within the material as the crosslinking process progresses.

The present invention is especially applicable to the production of tubes, for example plastic tubes, for conveying water and to the production of flexible tubular conduits of composite structures comprising at lest one armouring, withstanding the internal pressure and the axial loads, and, preferably, an outer sheath such as a jacket. The armouring may comprise one or more plies constituted by the winding of metallic or plastic wires, or made of composite and/or fibre material. In particular, the said flexible tubular conduits may be of the high mechanical strength type which can be used especially in the exploitation of offshore oilfields. They may also be of the hydraulic flexible pipe type, in particular in the case of umbilicals constituted by the assembling of several hydraulic lines which are also used in the exploitation of offshore oilfields.

The subject of the invention is principally a flexible tubular conduit comprising a tube or an internal impervious jacket made of polyolefin, especially made of polyethylene, crosslinked by hydrolysis.

The subject of the invention is also a flexible tubular conduit characterized by the fact that it further comprises a plurality of separate layers comprising at least one ply of reinforcement armouring and one external jacket, the flexible tubular conduit withstanding at least an internal pressure of 20 bar and having an internal diameter not less than 25 mm.

The subject of the invention is also a process for manufacturing flexible tubular conduits comprising a tube or an impervious jacket made of polyolefin, especially made of polyethylene, one step of which consists in crosslinking by hydrolysis the tube or the jacket made of polyolefin, especially made of polyethylene.

The subject of the invention is also a device for crosslinking by hydrolysis elements made of polyolefin, especially made of polyethylene, comprising a source of water and heating means, characterized by the fact that the said device comprises means for carrying out the connection between the source of water and a flexible tubular conduit comprising a tube or an impervious jacket made of polyolefin, especially made of polyethylene, to be crosslinked by hydrolysis.

The invention will be better understood by means of the description hereinbelow of the attached figures given as non-limiting examples among which:

In FIGS. 1 to 10 the same references are used for designating the same elements.

Figure 1:
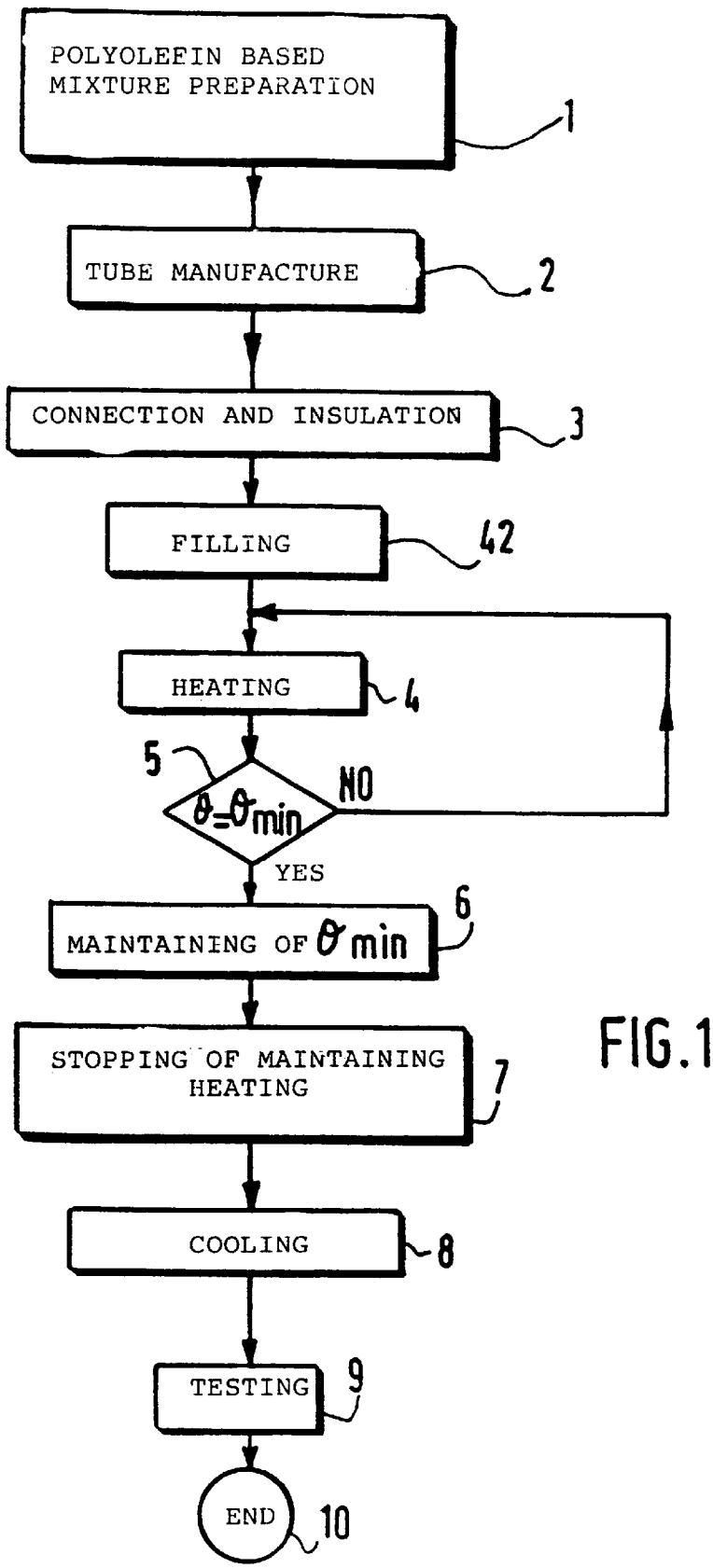
FIG. 1 is a flow chart of the process according to the present invention.

In FIG. 1 may be seen the steps of the process according to the present invention.

At 1, a plastic required for obtaining the impervious jacket made of polyolefin is prepared.

The procedure moves to 2.

At 2, flexible tubular conduits are manufactured.

The procedure moves to 3.

At 3, the flexible tubular conduit is connected to a crosslinking device according to the present invention and the flexible tubular conduit is possibly thermally insulated.

Figure 3:
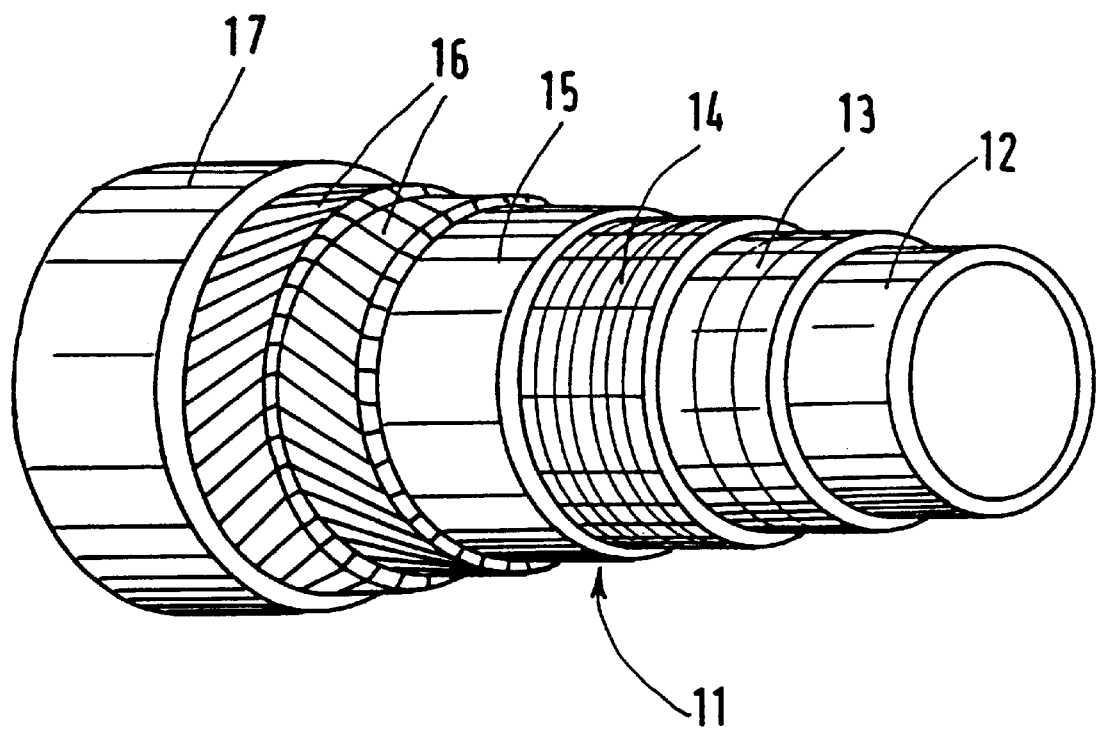
FIG. 3 is a cut-away view showing the structure of a second exemplary embodiment of a flexible tubular conduit according to the present invention.
Figure 4:
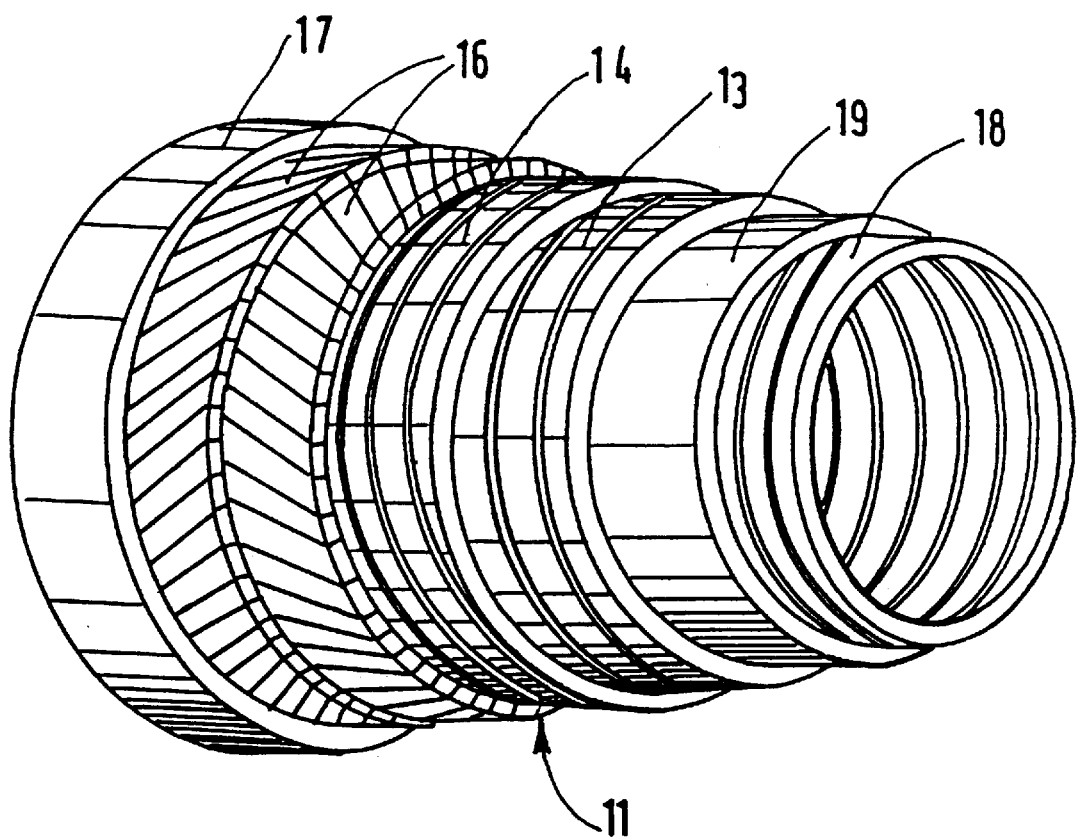
FIG. 4 is a cut-away view showing the structure of a third exemplary embodiment of a tubular conduit according to the present invention.
Figure 5:
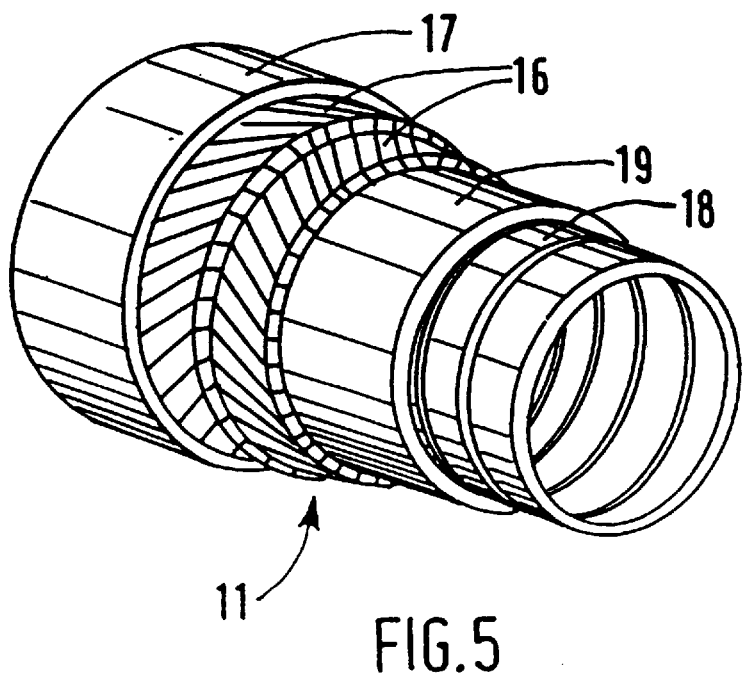
FIG. 5 is a cut-away view showing a fourth exemplary embodiment of a flexible tubular conduit according to the present invention.

It is thus particularly advantageous, in the case where the flexible tubular conduit in question comprises other layers around the tube or the internal impervious jacket to be crosslinked (as illustrated in FIGS. 3, 4 and 5), to proceed to the crosslinking operation when the manufacture of the successive layers of the conduit is completely finished, the two end fittings finally being mounted and enabling the conduit to be directly connected to the crosslinking device. This method of utilisation has the advantage of making it possible to produce longer continuous flexible conduits, despite the increase in pressure drop, because the structure of the flexible conduit is made capable, by virtue of the presence of the reinforcement armouring, of withstanding the high internal pressures thus created.

Alternatively, it is also possible to proceed to the crosslinking operation before having produced the assembly of layers which must be installed around the tube or the impervious jacket to be crosslinked. It is thus possible to connect the flexible conduit to the crosslinking device either directly after the manufacture by extrusion of the impervious tube 12 (FIG. 2 or 3), or of the impervious internal jacket 19 covering the fastened sheet 18 (FIG. 4 or 5) or when only one or more of the following layers have been produced, one or more of the outer layers being not yet manufactured. In order to facilitate the connection, it is possible to mount temporary fittings at the ends.

The procedure moves to 42.

At 42 the flexible tubular conduit is filled.

Alternatively, after filling and before starting the heating, a preliminary pressurising test may be performed.

The procedure moves to 4.

At 4, the fluid filling the flexible tubular conduit is heated, advantageously by circulating the said fluid.

The procedure moves to 5.

At 5, it is checked whether the minimum temperature, $\theta_{min}$, necessary for obtaining the crosslinking, corresponding to the planned treatment time, has been reached.

If not, the procedure moves to 4.

If yes, the procedure moves to 6.

At 6, the circulation of water continues while maintaining the heating which maintains the temperature $\theta_{min}$ inside the flexible tubular conduit for the duration fixed for the operation.

The procedure moves to 7.

At 7, the heating maintaining the temperature is stopped at a time $t_{min}$ at which the desired crosslinking has been reached.

The procedure moves to 8.

At 8, the flexible tubular conduit according to the present invention is cooled.

The procedure moves to 9.

At 9, the flexible tubular conduit according to the present invention is advantageously tested.

The procedure moves to 10.

At 10, the flexible tubular conduit according to the present invention is produced and tested. The process according to the present invention has come to an end.

The preparation of the plastics at step 1 depends on the type of flexible tubular conduit which it is desired to be able to produce. For the production of conduits for the exploitation of offshore oilfields, demanding flexible tubular conduits of very high quality the following two compounds are produced, for example.

For the first compound, polyethylene whose density with respect to water is greater than 0.930 is used for example. An ethylene homopolymer or copolymer or a mixture of the two, the density of which is between 0.930 and 0.965 is advantageously used, for example. The first step consists in creating free radicals by the action of a reaction initiator (peroxide) so as to permit the grafting of the silane functions. A grafting of units comprising one or more silane functions is then carried out. Advantageously, an agent of the VTMOS (vinyltrimethoxysilane), chloropropyltrimethylmethoxysilane, epoxytrimethoxysilanes or trimethoxysilane methacrylate type is used. This "grafted mixture" is extruded and granulated.

For the second compound, a mixture of polyethylene, of one or more agents enabling ultraviolet radiation to be withstood, of one or more antioxidants and of a catalyst is prepared. For example, 500 ppm of catalyst are used. Dioctyltin dilaurate or dibutyltin dilaurate is used as catalyst, for example. The quantity of polyethylene is sufficient for permitting the extrusion of a second mixture currently called "masterbatch". After the extrusion, a granulation is carried out.

In order to obtain the granulated material to be utilised in order to manufacture by extrusion the tube or the impervious jacket made of polyethylene to be crosslinked, the granules of the two compounds obtained are mixed so that the proportions of the silane-grafted polyethylene correspond, for example, to 98% and so that the mixture containing the antioxidant, the UV stabiliser and the catalyst currently called "masterbatch" accounts for 2%.

It is then possible to extrude the tube or the impervious jacket in a completely conventional manner. The operations described correspond to the utilisation of a known process, of the "SIOPLAS" type. It would also be possible to manufacture the tube or the extruded jacket by following another process employing a hydrolysis reaction, such as, for example, the "MONOSIS" process.

Step 2 for manufacturing the flexible tubular conduit depends on the type of flexible tubular conduit which it is desired to manufacture.

Figure 2:
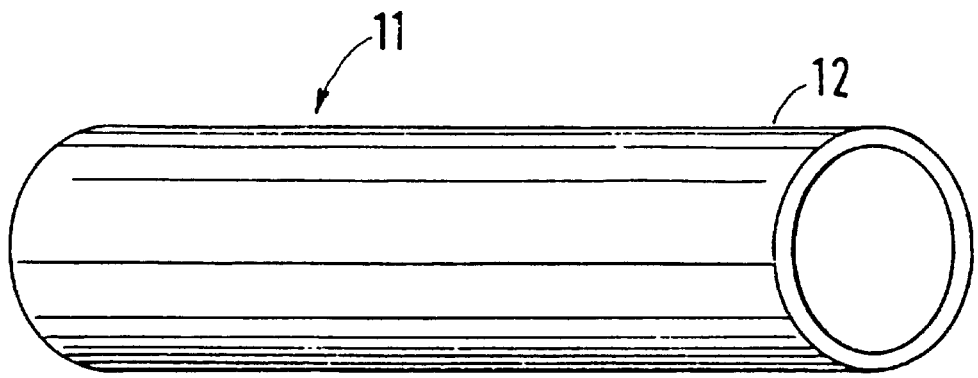
FIG. 2 is a perspective view of an exemplary embodiment of a flexible tubular conduit according to the present invention.

In the case of a flexible tubular conduit 11 illustrated in FIG. 2 comprising solely an impervious plastic tube 12 made of polyolefin to be crosslinked, advantageously made of high-density polyethylene, the manufacture of the flexible tubular conduit comes down to one extrusion.

The flexible tubular conduit 11 of FIG. 3 comprises an internal impervious tube 12 made of polyethylene, a first vault 13 in order to withstand the radial effect of the pressure, a second supporting member 14 in order to increase the pressure withstand, an intermediate plastic jacket 15, two crossplies of armouring 16 in order to withstand the axial traction and an external protective plastic layer 17.

The layer 12 provides the imperviousness especially to crude oil. It is advantageously produced by extrusion from the granulated mixture to be crosslinked, prepared as described hereinabove.

The layer 13 permits withstand to the internal pressure or to the external pressure and guarantees the absence of excessively large interstices between turns. It is produced by winding with a low pitch (spiralling) a wire of self-fastening shape (for example Z-shaped).

The layer 14 increases the withstand to the internal and external pressure and is produced by spiralling a wire of rectangular cross-section, for example.

The layer 15 is produced currently by extrusion. It may or may not be impervious.

The crossed armourings 16 permit withstand to the axial traction. They are laid at an angle, for example at 35°.

The external layer 17 provides the protection of the flexible tubular conduit during the laying operations and once the flexible tubular conduit is laid it prevents seawater from penetrating into the flexible tubular conduit. The layer 17 is currently produced by extrusion.

The flexible tubular conduit 11 illustrated in FIG. 4 furthermore comprises a fastened sheet 18 placed inside an impervious jacket 19 made of polyolefin to be crosslinked.

Depending on the particular characteristics specific to the structure of the flexible tubular conduit 11 to be treated, the presence of the fastened sheet 18 inside the impervious jacket 19 may delay, more or less, the build-up of the crosslinking process. It has been discovered that by maintaining a sufficient internal pressure in the flexible tubular conduit 11, for example 20 bar, it was possible more rapidly to reach the desired value of the level of crosslinking. This permits, in particular, the increase in the portion of the inner surface of the internal impervious jacket to be crosslinked 19 which constitutes the interface in contact with the water, in the liquid or gaseous phase, present in the fluid which is/contained in the flexible tubular conduit.

In FIG. 5 may be seen a simplified flexible tubular conduit 11 comprising a fastened sheet 18 surrounded by an impervious jacket 19, crossed armourings 16 for withstanding the traction which are laid at an angle substantially equal to 55° in order to produce a balanced tubular conduit 11 and an external jacket 17.

It is obvious that the use of non-metallic armouring using, for example, fibres, for example glass or aramid fibres or fibres disposed in a thermosettable or thermoplastic matrix, does not depart from the scope of the present invention.

Figure 6:
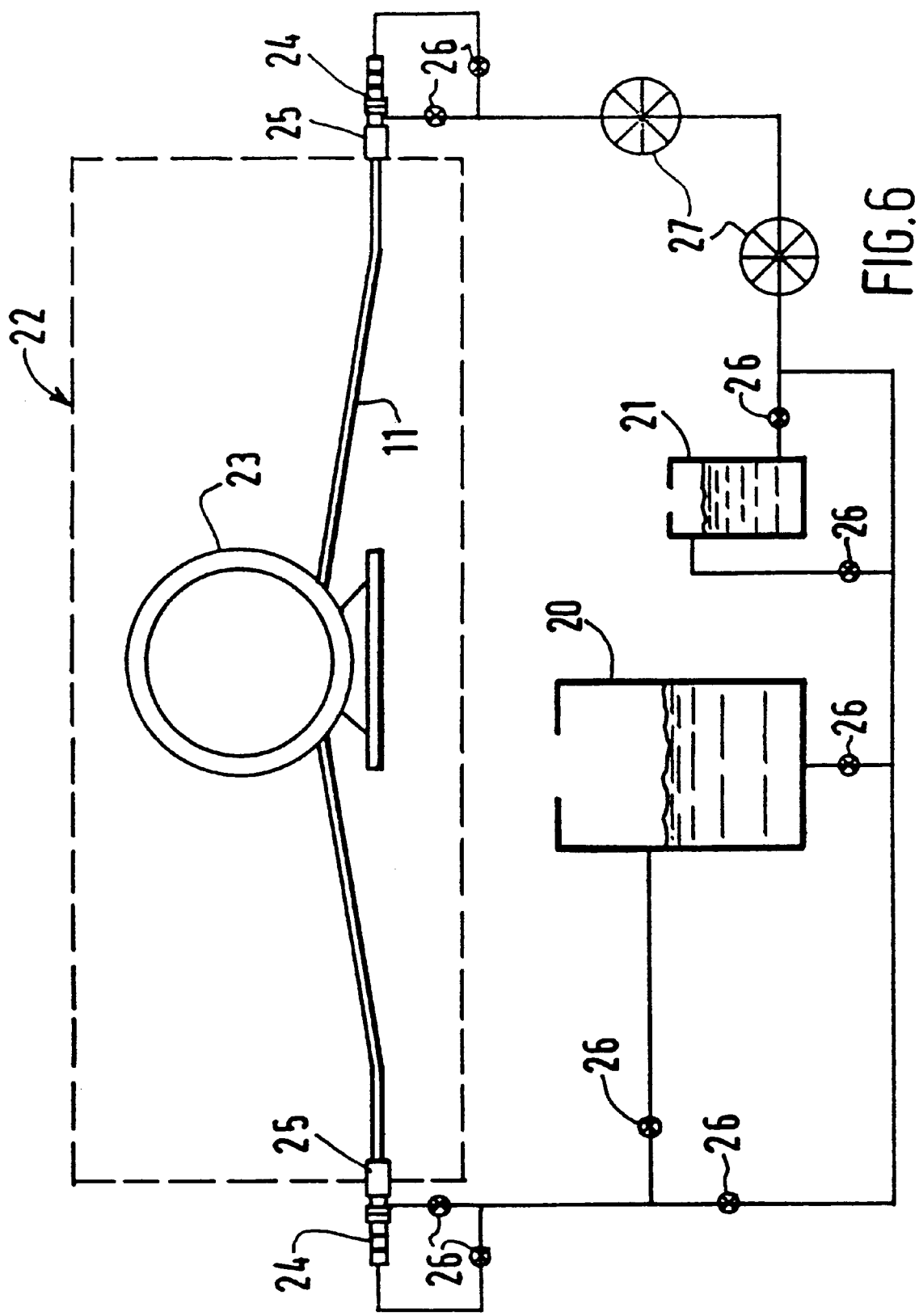
FIG. 6 is a diagram showing a first exemplary embodiment of a crosslinking device according to the present invention.
Figure 7:
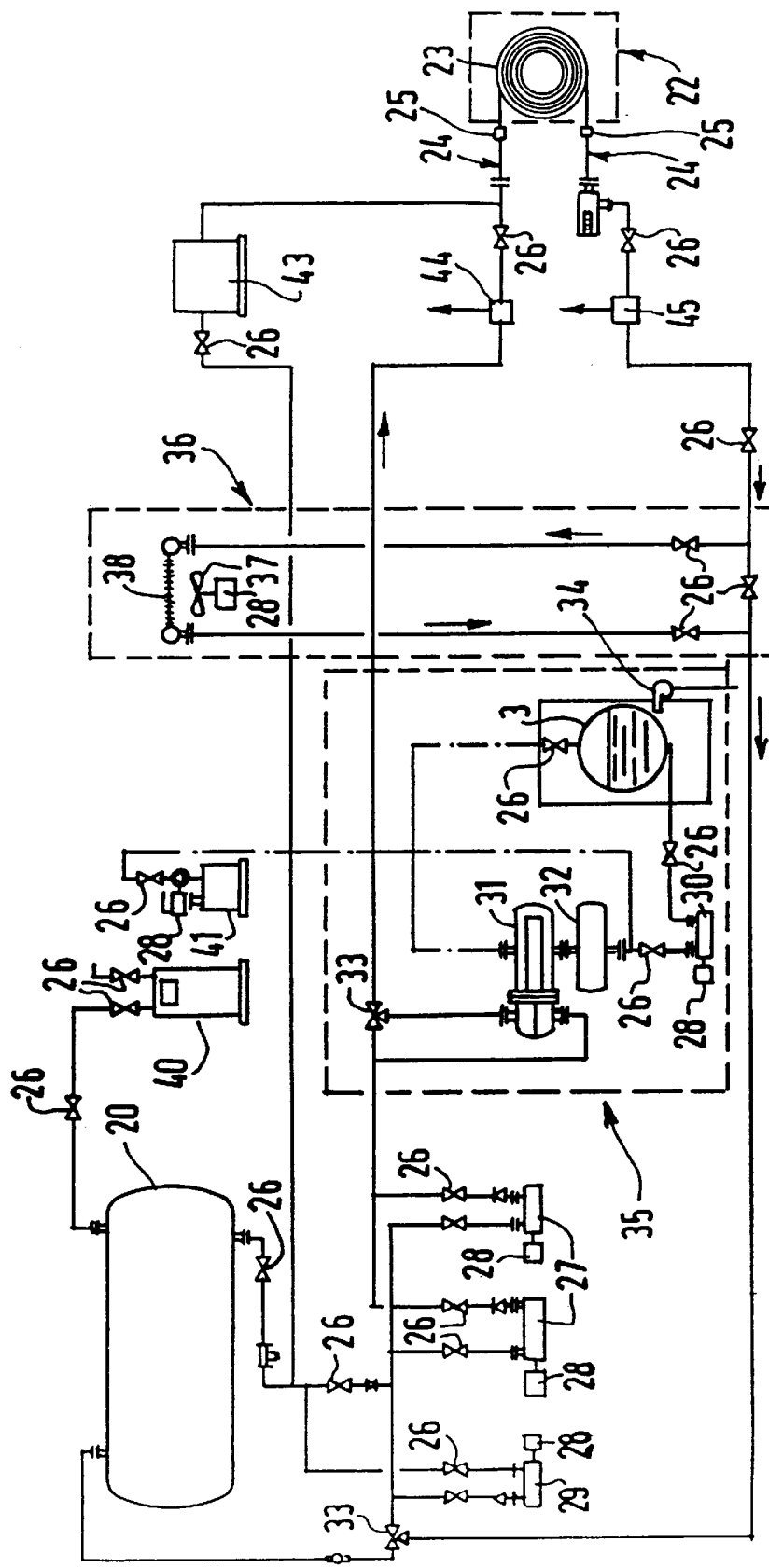
FIG. 7 is a diagram showing a second exemplary embodiment of a crosslinking device according to the present invention.

At 3 (of FIG. 1) the flexible tubular conduit produced is connected to a crosslinking device such as that illustrated in FIGS. 6 or 7.

One of the novel features of the invention resides in the use of the flexible tubular conduit itself for producing the crosslinking of the impervious jacket.

At 42, the flexible tubular conduit is filled with a fluid supplying heat and/or water required for a crosslinking by hydrolysis.

Advantageously, water is used at a temperature which is high but which, however, is less than the threshold for melting the small crystallites, namely approximately 120° C., in order to raise and then maintain the temperature and to supply the water required for the hydrolysis reaction. The water is preferably in the form of liquid. However, the use of water vapour does not depart from the scope of the present invention. For a given thermal insulation, it will often be necessary to obtain very high flow rates of water vapour in order to maintain the minimum temperature guaranteeing the production of the desired crosslinking during the reaction time. However, since water vapour has a very low viscosity, these flow rates may be maintained. Before proceeding to the circulation of heated vapour, it is advantageous to cause hot air to be circulated.

Advantageously, during the operation of filling the flexible tubular conduit with water, the air is forced out in order to avoid forming a mixture which is difficult to control.

At 4, there is provided the initial heating required in order to reach, at the downstream end of the flexible conduit, at least the minimum temperature $\theta_{min}$ at which it is desired to see the crosslinking reaction carried out. This condition is obtained by circulating the fluid used, for example water, with a sufficiently high flow rate in order that the reduction in the temperature from the upstream end to the downstream end of the conduit remains less than the minimum value fixed for the operation, dependent on, in particular, the planned duration during which it is essential to ensure the circulation of hot water while maintaining the temperature within the specified limits. Simultaneously, it is ensured that the intensity of the heating remains within the limits such that the temperature at the upstream end of the flexible conduit remains less than the maximum temperature, $\theta_{max}$ imposed. This limit, $\theta_{max}$ for example 98° C., is fixed so that the compression withstand of the polyethylene remains greater than a certain minimum, for example 5 MPa.

As is seen at 5, the initial heating, adjusted so that the inlet temperature does not exceed $\theta_{max}$ and the flow rate, such that the minimum temperature has not been reached, are maintained.

Thus, for example, the intensity of the heating and the flow rate of water are adjusted so that the temperature $\theta$ at any point of the tube or of the jacket to be crosslinked is maintained between 92 and 98° C. (98° C. at the inlet and 92° C. at the outlet).

When the minimum temperature has been reached, as illustrated in 6, the water is continued to be made to circulate by controlling the intensity of the heating and the flow rate so that the temperatures at the inlet and at the outlet of the flexible conduit remain, respectively, less than $\theta_{max}$ and greater than $\theta_{min}$. The operation is thus continued for a minimum time guaranteeing the level of crosslinking desired. For example, with the polyethylene described hereinabove, a crosslinking of at least 75% is obtained for a minimum temperature of 92° C. inside the flexible tubular conduit for a time t equal to four days; a continuation of the process, in combination with an increase in the level of VTMS, peroxide and catalyst, permits a crosslinking of 85% to be reached. The minimum duration during which the crosslinking operation must be carried out during step 6, from the moment when the minimum temperature $\theta_{min}$ is reached at every point of the piping, is determined from preliminary tests, the purpose of which is to determine the kinetics of crosslinking. It is thus possible to carry out the crosslinking of various specimens of a material identical to that provided for the manufacture of the tube or of the jacket made of crosslinked polyolefin, these crosslinking tests being carried out at varied temperatures. For each of the crosslinking temperatures thus tested, the development of the level of crosslinking obtained is measured as a function of the duration of operation, it being advantageously possible for this determination to be made by means of the measurement of the gel content. Under the conditions of utilisation of the invention, it has been found that the crosslinking temperature must be, advantageously, greater than 85° C. and, preferably, than 90° C., which enables a level of crosslinking at least equal to 80% of the potential level of crosslinking to be obtained in a reasonable time period, and making it possible, currently, to reach almost 100% of this value. For a crosslinkable material of given composition, the potential level corresponds to the limiting value towards which the level tends when the duration of the operation increases. It is particularly important, in the case of the manufacture of the flexible conduits intended for offshore oil installations, to reduce the time required for the operation as it increases the delivery time, this period of time being generally of critical importance.

On the basis of the preliminary tests, a determination is thus made of the minimum duration required for the operation so as to obtain the fixed level of crosslinking, depending on the envisaged temperature, this temperature having to correspond to the minimum temperature to be respected at every location of the material subjected to crosslinking, that is to say, in practice, to the outlet temperature $\theta$ outlet at the downstream end of the conduit connected to the crosslinking device. The temperature $\theta$ inlet at the upstream end being fixed to a given value limited to a maximum, $\theta_{max}$, defined as described hereinabove, it is then possible to determine the water circulation flow rate required for maintaining the temperature drop ($\theta$ inlet–$\theta$ outlet) less than the planned value and the corresponding pressure drops as well as, depending on the thermal insulation 22, the heating power enabling the temperature a inlet to be maintained at the fixed value. It is thus possible, in each case, to optimise the parameters controlling the operation, it being possible to reduce the total duration at the expense of an increase in the flow rate and in the heating power.

The parameters controlling the operation thus being fixed for a given manufacture, it is possible to guarantee on these bases the final quality of the product by carrying out the crosslinking operation for a duration at least equal to the minimum duration specified hereinabove, the hot water circulation flow rate being maintained at a value at least equal to the value also mentioned hereinabove. The temperature $\theta$ inlet being measured by a sensor, for example a thermocouple 44 mounted on the circuit of the crosslinking device just before its connection with the upstream end of the flexible conduit, the intensity of heating is continually adjusted so that $\theta$ inlet is never less than the value planned, as hereinabove, whilst remaining less than the limit $\theta_{max}$. By reference to the preliminary tests, it has thus been ensured that the level of crosslinking obtained is at least equal to the fixed value at every point of the flexible conduit, including the downstream end of the conduit, at the location where the temperature and, consequently, the level of crosslinking, are the least. The device may be completed by a direct measurement of θ outlet by means of a second sensor, for example a thermocouple 45 on the crosslinking circuit just after its connection before the downstream end of the flexible conduit.

Furthermore, it is possible, when a crosslinking operation has been carried out, for the first time, on a flexible conduit of given characteristics and under given operational controls, to verify the result obtained by cutting a downstream end fitting in order to measure directly the level of crosslinking. This verification on the first manufacturing run then makes it possible to qualify all the subsequent manufacturing runs for flexible conduits of the same characteristics.

As soon as the minimum time has been reached, there is the certainty of having an impervious jacket crosslinked to the desired level.

It will be noted that a preliminary crosslinking step has already been carried out during the transitory temperature-increase phase corresponding to steps 4 and 5 and that, likewise, a supplementary crosslinking step is carried out during the final transitory cooling phase corresponding to step 8. Since these supplementary phases of the crosslinking process are added to the main crosslinking operation which is carried out for a duration at least equal to the minimum duration and corresponds to step 6, this results in a safety margin making it possible to reinforce the assurance that the level of crosslinking intended has actually been obtained. Alternatively, it is also possible to take into account, entirely or in part, the crosslinking process supplement resulting from the initial and final transitory phases.

Thereafter, (step 7 of FIG. 1), it is possible to carry out the cooling (step 8) of the flexible tubular conduit. This cooling may be obtained, for example, by removing the thermal insulation 22, described hereinbelow, installing at step 3 and/or by cooling the water circulating in the flexible tubular conduit.

Advantageously, for increased safety, a measurement of the crosslinking obtained is carried out each time that there is a change in an important characteristic of the flexible tubular pipe which runs the risk of influencing the crosslinking process. This test is, for example, carried out by demounting the fitting on the downstream side, by cutting off a portion of the crosslinked jacket and by measuring the level of crosslinking reached. A fitting is remounted if the flexible tubular conduit meets the specification.

The flexible tubular conduits must necessarily undergo at the end of manufacture a test by subjecting them to a hydrostatic pressure. In the case where the flexible tubular conduit 11 is in its final state of manufacture, the end fittings 25 already being mounted, it is possible to carry out at step 9 the end-of-manufacture pressure test. In the case where the conduit 11 connected to the crosslinking device is in an intermediate state of manufacture and must be completed by other layers of the structure such as a pressure-supporting vault and/or armouring and/or other extruded jackets, the conduit is disconnected at the end of step 8 with a view to proceeding to the completion of the manufacture in a conventional manner. It is obvious that the non-tested flexible tubular conduits, where the testing of these is carried out subsequently, do not depart from the scope of the present invention.

In FIG. 6 may be seen a first exemplary embodiment of the crosslinking device according to the present invention. The device of FIG. 6 comprises a source of hot water and means for causing the hot water to circulate in the flexible tubular conduit 11. The hot water comes, for example, from a first tank 20 containing water at 80° C. in order to preheat the flexible tubular conduit 11 or from a second tank 21 containing water whose temperature is between 95 and 98° C. The tanks 20 and 21 are connected, both in the supply and the return directions, via valves 26 to the general water circuit. In the example of FIG. 6, the water is circulated by means of an assembly of two pumps 27. The pressure provided by the pumps 27 is determined as a function of the flow rate required by the pressure drops down the length of the flexible conduit and down the pipework and components of the crosslinking device, and, if necessary, by the planned minimum pressure at the downstream end of the main flexible conduit. The main water circuit is connected, by the agency of connection devices 24, permitting the insertion of scrapers or other types of pigs into the piping circuit, at fittings 25 previously mounted to each end of the flexible tubular conduit 11. In the example illustrated in FIG. 6, the flexible tubular conduit is wound on a support 23, advantageously on a reel. It is insulated thermally by means of a thermal insulation 22. The sole fact of winding the flexible tubular conduit on a reel 23 limits the heat losses to an extent of, for example, 180 kW for an external temperature of 0° C. and an inlet temperature of 98° C. and with a temperature difference of 6° C. between the inlet and the outlet of the flexible tubular conduit to be crosslinked. The thermal insulation may consist, for example, of an insulation of the flanges and of the external turns. The thermal losses depend on the dimensions of the reel and on the quality of the insulation. In an exemplary embodiment of the thermal insulation, the losses are equal to 70 kW for an 8.2 m diameter reel.

The thermal insulation is particularly advantageous in the case of relatively small diameters, approximately less than 100 mm.

In FIG. 7 may be seen a second exemplary embodiment of the crosslinking device according to the present invention. The device of FIG. 7 comprises a tank 20 capable of filling the water circulation circuit and the largest flexible tubular conduit which it is desired to be able to treat. The device according to the present invention comprises a heating device 35 raising and maintaining the temperature required for the crosslinking reaction. The circulation of the water of the conduit to be crosslinked is provided, for example, by one of the two pumps 27 shown in the circuit. The maintaining of a minimum pressure at the downstream end of the flexible tubular conduit is advantageously provided by a pump 29 inducing a reverse pressure of 20 bar, for example. Alternatively, the minimum pressure may be obtained by causing the circulation of the fluid leaving the flexible conduit through a calibrated orifice such as a nozzle or flow bean (choke in Anglo-Saxon terminology) or by connecting to the fluid circuit a pneumatic accumulator adjusted to the desired pressure.

Advantageously, the cooling of step 8 of FIG. 1 is provided by a cooling device 36 which may be isolated by valves 26. In the example illustrated in FIG. 7, a hydraulic test unit 43 enables the flexible tubular conduit to be pressure-tested after crosslinking. Advantageously, the device according to the present invention comprises conventional devices permitting the operation of hydraulic circuits. The driving, especially of the pumps, is provided by electrical motors 28. A water-softener 40 supplies the tank 20 with water free of inorganic salts. An injection station supplies the hydraulic circuit with corrosion-inhibiting agents.

It is possible to have cause to treat flexible tubular conduits whose internal diameter is, for example, between 10 and 500 mm, typically between 75 and 300 mm. In addition, for the same diameter of storage reel 23, the storage length increases when the diameter of the conduit decreases. For example, for conventional flexible tubular conduits for offshore oil exploitation, it is possible to store 6.2 km of flexible tubular conduit of 75 mm internal diameter and 950 m of tubular conduit of 300 mm internal diameter. Since the pressure drops increase with the length and when the diameter decreases, it has proven advantageous to use, for flexible tubular conduits whose internal diameter is, for example, less than 75 mm, a pump different from that used for flexible tubular conduits of an internal diameter not less than 75 mm.

The flow rate required for maintaining the temperature difference ($\theta$ inlet–$\theta$ outlet) less than the fixed limit is provided by the pumps 27. For the diameter and length dimensions of flexible tubular conduits usually produced, such as described hereinabove, the required flow rate varies between, for example, 5 tonnes of water per hour for a 50 mm internal diameter and approximately 50 tonnes per hour for an internal diameter not less than 150 mm. In the case where the storage capacities, on a reel or in a basket could be, in the future, 2 to 5 times, for example, greater than at present, the necessary flow rate could reach 100 to 200 tonnes per hour.

In the case of FIG. 7, the required heating means 35, in a first phase of the operation corresponding to steps 4 and 5, in order to obtain the temperature $\theta_{min}$ at every point of the conduit 11 in a reasonable time period, (which is, in general, the criterion for sizing the heating power) and, subsequently, during the step 6 for compensating the thermal losses so as to maintain the temperature above $\theta_{min}$, comprise a boiler 3 generating low-pressure steam and reheating the main water circuit by means of an exchanger 31. Advantageously, the low-pressure steam circuit comprises an expansion unit 32. The return of the condensed steam to the boiler 3 is provided by a pump 30. In the example illustrated, the boiler is heated by gas burners 34. The boiler has a power of 600 kW, for example, for the treatment of one reel and of 1000 kW for the simultaneous treatment of four reels 23 of flexible tubular conduit. The sensor 45, for example, a thermocouple, disposed on the piping for circulating the water close to the downstream connection 24, enables the temperature of the water at the outlet, $\theta$ outlet, to be measured and to verify that $\theta$ outlet does not fall below the minimum temperature guaranteeing the production of the desired crosslinking, $\theta_{min}$.

In order to be able to guarantee that the temperature of the water circulating in the flexible tubular conduit to be treated does not exceed the fixed maximum temperature $\theta_{max}$, the water circuit is provided with a first three-way valve 33, enabling the hot water coming from the exchanger 31 to be mixed with the cooled water coming from the flexible conduit and which has been brought, by means of one of the pumps 27, to the pressure enabling the fixed flow rate value to be assured. It is thus possible to adjust the inlet temperature $\theta$ inlet in the flexible conduit to the fixed value, the inlet temperature $\theta$ inlet being measured by a sensor 44, for example a thermocouple, which enables the temperature of the water circulating in the conduit to be guaranteed not to exceed the fixed maximum temperature $\theta_{max}$. A second three-way valve 33 permits the initial filling of the flexible tubular conduit to be treated by connecting the tank 20 to one of the pumps 27. Once the filling is carried out, the second three-way valve 33 enables a closed circuit excluding the tank 20 to be formed.

Advantageously, the cooling circuits 36 comprise a cooling tower comprising a spiral 37 driven by an electrical motor 28 blowing over a radiator 38. For an airflow rate of 50 tonnes per hour, with an external temperature of 20° C., it is possible to bring down the temperature of a flexible tubular conduit from 98° C. to 35° C. by the end of 24 hours.

In an interesting variant, not shown, the crosslinking device, for example similar to that illustrated by FIG. 7, may be supplemented by a catalyst-feed station which may be disposed, for example, in an analogous manner to the station 41 for injecting corrosion-inhibiting agents.

For example, the following values have thus been obtained:

EXAMPLE 1 tests on a "Rough-Bore"-type flexible pipe internal diameter: 101.6 mm thickness of the jacket 19 made of polyethylene: 6 mm minimum temperature maintained at the outlet $\theta_{min}$: 90° C.

level of crosslinking obtained equal to:
at the end of 60 hours: 65%
at the end of 90 hours: 70%
and practically equal to the potential level of crosslinking of 72% in less than 120 hours.

EXAMPLES 2, 3, 4 and 5 relating to smooth conduits (Smooth Bore) with an internal tube 12 made of polyethylene

EXAMPLE 2 internal tube 12 of 63 mm diameter and 5 mm thickness minimum temperature ensured: 95° C.

duration of the crosslinking operation: 48 hours level of crosslinking obtained: 71% for a potential level of crosslinking of 74%

EXAMPLE 3 internal tube 12 of 304.8 mm diameter and 10 mm thickness length of flexible conduit: 950 metres minimum temperature: 92° C.

duration: 96 hours level of crosslinking obtained: 69% with a hot water flow rate: 50 tonnes/hour providing a temperature reduction ($\theta$ inlet–$\theta$ outlet)=6° C. and determining a pressure drop in the flexible conduit 11 equal to 0.025 bar.

EXAMPLE 4

Internal tube 12 of 50.8 mm diameter and 10 mm thickness length of conduit: 7000 m minimum temperature: 92° C.

duration: 96 hours level of crosslinking obtained: 69% with a hot water flow rate: 9 tonnes/hour providing a temperature reduction= 6° C. in conjunction with a significant thermal insulation and determining a pressure drop of 34 bar.

EXAMPLE 5

Internal tube of 101.6 mm diameter thickness: 6 mm conduit of length: 6000 m minimum temperature: 94° C.

duration: 72 hours level of crosslinking obtained: 68% for a potential level of crosslinking of 70% with a flow rate of 25 tonnes of water per hour, providing a temperature difference of 4° C. and determining a pressure drop of 9.5 bar.

EXAMPLES 6 AND 7 relating to manufacture of prototype conduits of the "Rough Bore" type with internal casing made of fastened sheet.

EXAMPLE 6

Flexible conduit comprising, from the inside outwards
internal casing 18. Fastened tape. internal diameter: 152.4 mm
impervious jacket 19 made of crosslinked polyethylene:
 inner diameter: 165 mm
 outer diameter: 177 mm
 thickness: 6 mm
armouring 16 composed of 2 plies of wires made of steel which are wound helically
outer jacket 17 made of non-crosslinked polyethylene.
length of the flexible conduit connected to the crosslinking device: 3,600 metres.
main parameters of the crosslinking operation:
 flow rate: 60 m$^3$/hour
pressure downstream of the flexible conduit: 25 bar
pressure upstream of the flexible conduit: 33 bar
pressure drop in the flexible conduit: 8 bar
temperature at the inlet of the flexible conduit: 105° C.
temperature at the outlet of the flexible conduit: 100° C.
duration of the initial temperature-rise phase: 16 hours
duration of the operation at constant temperature: 120 hours
duration of the terminal cooling phase: 20 hours.
gel content measured at the downstream end of the conduit, in the zone of the polyethylene jacket where the level of crosslinking is the lowest: 74%

The device did not comprise thermal insulation means on the outside of the flexible conduit wound on a reel.

EXAMPLE 7

Flexible conduit comprising, from the inside outwards:
 internal casing 18 of inner diameter: 152.4 mm
 impervious jacket 19 made of crosslinked polyethylene
  inner diameter: 165 mm
  outer diameter: 177 mm
  thickness: 6 mm
 armouring 16 composed of 2 plies of steel wires wound helically
 jacket made of polyethylene
 layer of thermal insulation, thickness 16.5 mm, made of expanded PVC
 outer jacket made of non-crosslinked polyethylene.
total length of the flexible conduit wound on a reel, connected to the crosslinking device: 4,262 metres
main parameters of the crosslinking operation
 flow rate 50 to 55 m$^3$/h
 pressure downstream of the flexible conduit: 25 bar
 pressure upstream of the flexible conduit: 32 to 33 bar
 temperature at the inlet of the flexible conduit: 100° C.
 temperature at the outlet of the flexible conduit: 95° C.
 initial temperature rise: 14 hours
 maintenance at constant temperature: 240 hours
 cooling: 18 hours
gel content measured at the location of its lowest value: 74%.

It is to be noted that, in the case of this example 7, the thermal insulation incorporated into the wall of the flexible conduit plays a favourable role, analogous to the role that would be played by the thermal insulation means which may be disposed, as illustrated at 22 in FIGS. 6 and 7, around the volume occupied by the flexible conduit. On the other hand, it is clear, in relation to a non-insulated flexible conduit, that it would be even more difficult, in fact practically impossible, to carry out the crosslinking of the impervious internal jacket 19 of such a flexible conduit with thermal insulation by using a known crosslinking method with heat supply via the outside of the conduit.

6 mm thickness tube specimens produced from polyethylene having levels of crosslinking varying between 70 and 74% and a density of 0.945 where placed in an autoclave enclosure heated to 100° C. and alternately filled with crude oil and with methane. The specimens are thus subjected to a succession of pressurisation and depressurisation cycles, the pressure varying very rapidly between 100 bar and atmospheric pressure. The test procedure consists in repeating series of pressurisation/depressurisation elementary cycles, each series lasting 200 hours and comprising 10 cycles in the presence of crude oil and 10 cycles of methane.

A first batch of specimens (specimens A) was produced by a SIOPLAS-type process with the following characteristics:
 95% grafted mixture constituted by a grafted polyethylene of density 0.943, the silane used being VTMOS
 5% of masterbatch based on polyethylene of density 0.943 comprising DBTDL used as catalyst.

Silane-crosslinked polyethylene samples were thus produced having a measured level of crosslinking of 72%, very close to the potential level of crosslinking.

These specimens A underwent 50 series of 20 cycles, the total duration reaching 10,000 hours. No trace of blistering nor of cracking was observed in these specimens.

Based on the acquired experience relating to the behaviour of polymers and/or copolymers in service under actual use conditions, by comparing the results obtained by the same materials subjected to the test procedure described hereinabove, it was established that the flexible tubular conduit internal impervious tubes or jackets produced with such plastics have good hydrocarbon resistance under the actual conditions of exploitation and for long periods of use when the specimens of the material constituting the tube or the jacket have successfully undergone the tests described hereinabove for a period of 10,000 hours. The results thus obtained show that, contrary to what was established up to then, tubes or jackets made of polyolefin, and particularly made of polyethylene, crosslinked by silane have a completely satisfactory compatibility with crude hydrocarbons.

The tests (on specimens) described hereinabove were carried out by applying a method whose principle has been expounded during the conference "Improved Thermoplastic Materials for Offshore Flexible Pipes" given by F. A. DAWANS, J. JARRIN, to LEFEVRE and M. PELLISSON during the 18th session of the OTC at Houston (OTC 5231) mentioned hereinabove and which has been developed so as to evaluate the compatibility of plastics or elastomers with hydrocarbons, by testing their resistance to blistering (Anglo-Saxon terminology), to swelling and to deterioration in the presence of gaseous or liquid hydrocarbons, and which enables, in particular, the various materials envisageable to be compared for such applications.

Furthermore, additional tests have been carried out on various specimens by using a procedure, developed by the filing company, which consists in exerting successive cycles of pressurisation-depressurisation on specimens placed in a cell filled with a specific hydrocarbon. This method enables results to be obtained more rapidly and it has been found that the results that are obtained are equivalent to those obtained by the first method which alternates cycles with crude oil with cycles with methane.

A second batch—specimens B—was prepared by a SIOPLAS-type process from 95% grafted polyethylene of density 0.945 and 5% of a masterbatch based on a polyethylene of density 0.945 with the catalyst DBTDL, the level of crosslinking obtained being 75% and thus having a difference not exceeding 5% in relation to the potential level of crosslinking which was estimated to be approximately 78 to 80%. These specimens were subjected, without damage, to the tests according to the accelerated method described hereinabove.

A third batch—specimens C—was, moreover, produced, still by the SIOPLAS process, also with 5% of the same masterbatch as the specimens B, but with a grafted polyethylene of density 0.963. The level of crosslinking obtained was 72%, the potential level of crosslinking being approximately 72 to 75%. Despite a value of the level of crosslinking which is less than that of specimens B, the tests by the accelerated method have given excellent results, judged qualitatively, even better than those of the specimens B. This tends to show the very favourable effect of a high density of the polyethylenes used.

Various comparative tests, moreover, have shown the necessity, in order to obtain a good result, of respecting the minimum values defined concerning the density of the polyethylenes implemented and the level of crosslinking reached, in particular the difference between the level reached and the potential level.

A first comparative batch—specimens D—was produced by the SIOPLAS process from 95% of grafted polyethylene of density 0.928, therefore less than the fixed value of 0.930, and from a masterbatch based on polyethylene of the same density 0.928. Despite a relatively high level of crosslinking of 80%, practically equal to the potential level, the specimens, subjected to the tests according to the procedure with alternation of crude oil and of methane, were completely destroyed in less than 200 hours.

A second comparative batch—samples E—was produced by SIOPLAS process from 95% of a grafted polyethylene of density 0.943 and from 5% of a masterbatch based on polyethylene of density 0.930. Despite the higher densities than those of specimen D and a level of crosslinking of 75%, practically equal the potential level, traces of blistering appeared in less than 1,000 hours, which is not acceptable in the oil industry, during tests according to the crude oil and methane alternating method. It has thus been confirmed that the sole fact of using a polyethylene of a density of 0.930, just less than the fixed limit, suffices for determining an unacceptable result, and this being so although the compound thus having an insufficient density is only involved for 5% of the total weight of crosslinked polyethylene.

A third comparative batch—samples F—was produced by the SIOPLAS process from 95% of a grafted polyethylene (the silane used being a VTMOS) of density of 0.951 and from 5% of a masterbatch based on a polyethylene of density of 0.928, the level of crosslinking being 72%, practically equal to the potential level. These specimens F having been subjected to the tests according to the second procedure, which is accelerated, blistering was observed in less than 1,000 hours of tests, which proves the non-compatibility of these specimens with crude oil. Besides confirming the inability of the polyethylenes having a density less than the fixed limit to withstand crude oil, this test also shows that there is a satisfactory crosscheck between the results obtained by the two test methods used.

Figure 8:
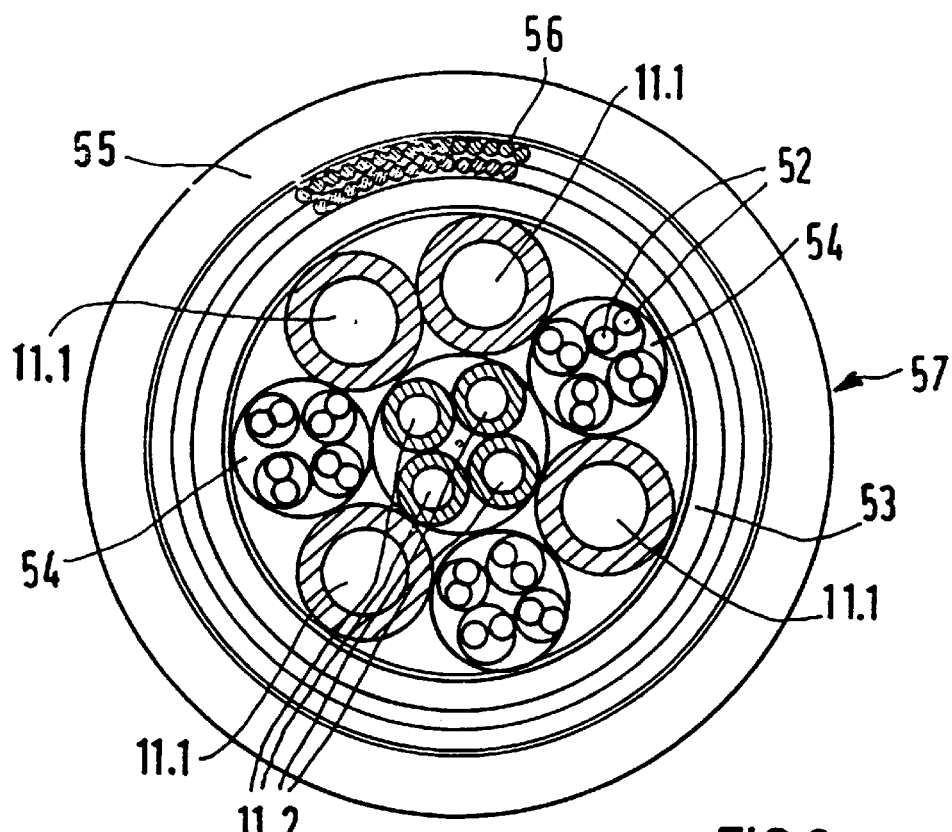
FIG. 8 is a diagram showing an exemplary embodiment of an umbilical flexible tubular conduit according to the invention.

The subject of the present invention is also the crosslinking by silane of the impervious internal tube 12, made of polyolefin, advantageously made of polyethylene, of a flexible conduit 11 incorporated into a flexible bundle of the umbilical type, an exemplary embodiment which is illustrated in FIG. 8. The umbilical flexible pipes may be used in installations for hydraulic or electrohydraulic remote-controlling of offshore equipment, in particular for production from oil deposits, and for ensuring the control of wells, the injection of fluids or other functions associated with the exploitation of the deposit, including, if necessary, the transporting of oil or of crude oil. It is important for the conduit injecting a fluid to be, on the one hand, impervious to the various fluids to be transported and, on the other hand, is compatible with these various fluids. The use of silane-crosslinked polyethylene as an internal impervious tube enables the permeability to methanol, for example, to be divided by approximately 50, in relation to polyamide 11.

The example of the umbilical flexible pipe 57 illustrated in FIG. 8 comprises at its centre an assembly comprising four hydraulic flexible tubular conduits 11.2 of small internal diameter, for example substantially equal to 6 mm and four hydraulic flexible tubular conduits 11.1 of an internal diameter equal to 12 mm which are disposed around the central assembly constituted by the four hydraulic flexible pipes 11.2. The umbilical flexible pipe of FIG. 8 furthermore comprises 3 bundles 54 of electrical conductors. Each bundle 54 comprises four pairs of insulated electrical conductors 52. The electrical conductors 52 are, for example, intended for conveying remote-control signals.

The flexible tubular conduits 11.1, the bundles 54 and the flexible tubular conduits 11.2 are disposed in continuous helices, or in sections of alternate helices with periodic inversion of the angle of the helix (SZ arrangement).

Advantageously, the umbilical flexible tubular conduit comprises an external jacket 55 produced by extrusion, for example made of low-density polyethylene (LDPE) and armourings 56 which are, for example, made from round steel wire. The umbilical flexible pipe may, furthermore, comprise an intermediate jacket 53 serving as a bedding for the armourings 56, for example made of low-density extruded polyethylene.

In the current state of the art, the impervious tube of the hydraulic flexible pipes such as 11.1 and 11.2 is currently made from polyamide 11 for example, or even from an elastomeric polyether such as that sold under the HYTREL brand by the Dupont de Nemours Company, these materials generally being considered as having a more or less satisfactory compatibility in relation to the various fluids to be transported, that is to say not being prone to be degraded unacceptably in the presence of one or the other of these various fluids. On the other hand, it has recently been found that their excessive permeability to methanol, and to alcohols in general, is extremely detrimental in certain application circumstances.

The umbilical flexible pipe according to the invention, as described in FIG. 8, is characterized by the fact that at least one of the hydraulic flexible tubular conduits which it comprises, such as 11.1 and 11.2, is a flexible conduit 11 according to the invention, that is to say that it comprises an impervious internal tube 12 made of polyolefin, especially made of polyethylene, crosslinked by hydrolysis.

Figure 9:
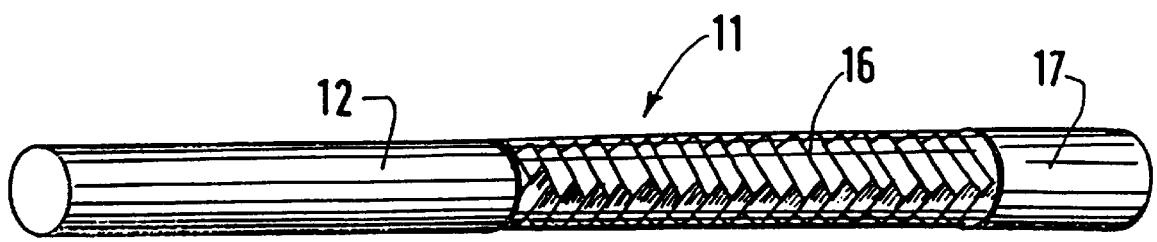
FIG. 9 is a diagram showing a flexible tubular conduit of the hydraulic flexible pipe type of the umbilical flexible tubular conduit of FIG. 8.

In FIG. 9 may be seen an exemplary embodiment of a hydraulic flexible tubular conduit 11. Depending on the application, it must be able to hold a pressure between 100 and 500 bar, typically 350 bar. The flexible tubular conduit 11 has, for example, an internal diameter which can vary from 3 mm to 30 mm. The conduit 11 comprises an internal tube 12, an armouring 16 and an external jacket 17. The internal tube 12 is made from polyolefin, especially made from silane-crosslinked polyethylene. The armouring 16 comprises, for example, fibres, advantageously made of aromatic polyamide, for example aramid, such as the fibres sold under the Kevlar brand by the Dupont de Nemours Company or under the Twaron brand sold by the Akzo Company. These fibres are, for example, laid in helices (plies), woven or braided. In a variant embodiment armouring 16 comprising metallic wires, for example made of steel, is used. The external jacket 17 is advantageously extruded. It is produced, for example, from polyamide or from polyurethane.

The crosslinking of the tube 12 of the hydraulic flexible tubular conduits 11 (such as 11.1 and 11.2 of FIG. 8) is carried out either via the outside, before the laying of the armouring 16 and of the external jacket 17, or by causing hot water, for example, to be circulated inside the tube 12. This latter method may be applied both to the tube 12 alone and to the hydraulic flexible tubular conduit 11 (such as 11.1 and 11.2), or even to the terminated umbilical flexible tubular conduit of FIG. 8.

Furthermore, it is also possible to produce outer 55 or intermediate 53 jackets of the umbilical flexible pipe of FIG. 8, or the outer jacket 17 of the flexible pipe 11 (such as 11.1 and 11.2) made of silane-crosslinked polyethylene, the supply of water and/or heat required for the crosslinking being performed via the outside.

Figure 10:
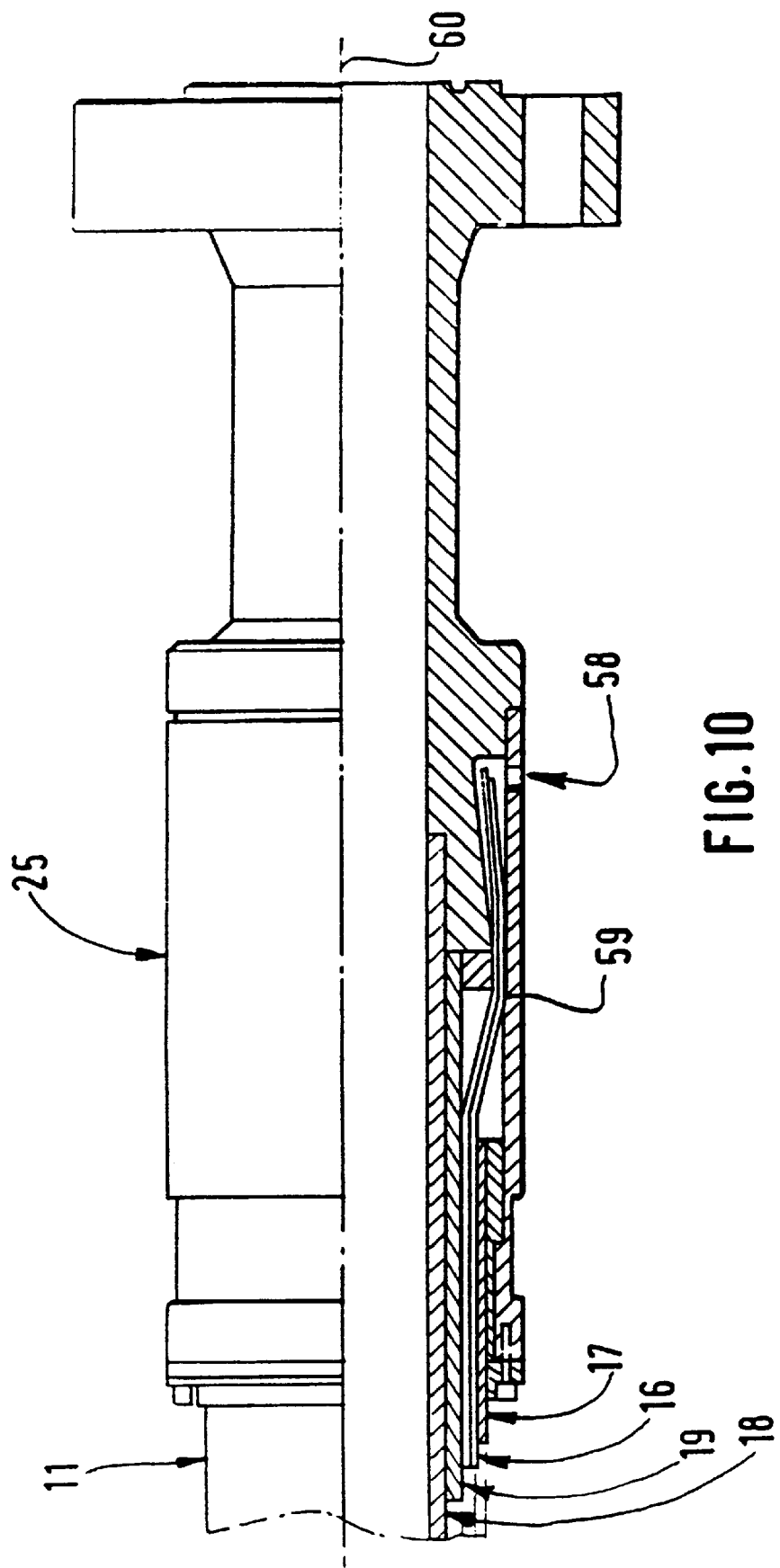
FIG. 10 is a diagram illustrating a fitting capable of being utilised in the process according to the present invention.

In FIG. 10 may be seen an example of a fitting 25 comprising an opening 58 for the extraction of the fluid released into the annular space of the flexible tubular conduit 11 during the crosslinking. In the example illustrated, the opening 58 is circular of axis perpendicular to the axis 60 of the conduit 11. In the example illustrated, the fitting 25 is equipped with a valve 59. It is obviously possible to replug the opening 58 by welding for example. However, it may prove interesting to enable the fluids, principally the gases defused through the impervious jacket 19, to be exhausted via the opening 58 and by the agency of the valve 59. For example, a jacket according to the present invention will not be perfectly impervious to the natural gas present in crude oil. The opening 58 and the valve 59 enable, in complete safety, these gases to be exhausted to the outside of the annular space of the conduit.

We claim:

1. A flexible tubular conduit for transporting offshore produced live crude oil comprising an internal impervious jacket, an outer jacket, and at least one armoring layer between said jackets, wherein said internal jacket is an extruded jacket of crosslinked polyethylene comprising one of a silane-grafted homopolymer and copolymer of ethylene having a density higher than 0.930 and being crosslinked by hydrolysis such that a level of cross-linking is at least equal to a fixed value at every point thereof, said value being not less than 70%.

2. A flexible tubular conduit as claimed in claim 1, wherein said internal jacket is crosslinked by hydrolysis at a temperature higher than 85° C. and less than 120° C.

3. A flexible tubular conduit as claimed in claim 1, wherein said extruded jacket comprises a mixture of one of homopolymers, copolymers, and homopolymers and copolymers of silane grafter polyethylene each having a specific gravity of not less than 0.931.

4. A flexible tubular conduit according to claim 1, wherein the difference between the rate of crosslinking of said internal jacket at the end of the crosslinking and the potential rate of crosslinking is not more than 10%.

5. A flexible tubular conduit for transporting offshore produced live crude oil, having an internal impervious jacket, an outer jacket, and at least one armoring layer between said internal impervious jacket and said outer jacket, wherein said internal jacket comprises:

an extruded jacket of cross-link polyethylene comprises one of a silane-grafted homopolymer and copolymer of ethylene having a density of higher than 0.930 and being cross-linked by hydrolysis such that a level of cross-linking is at least equal to a fixed value at every point thereof, said value being not less than 70%.

* * * * *